United States Patent [19]
Lutz

[11] Patent Number: 5,524,356
[45] Date of Patent: Jun. 11, 1996

[54] APPARATUS FOR EXTRACTING OIL FROM SPENT OIL FILTERS

[76] Inventor: George H. Lutz, 1210 Front St., Binghamton, N.Y. 13905

[21] Appl. No.: 201,681

[22] Filed: Feb. 25, 1994

Related U.S. Application Data

[63] Continuation-in-part of Ser. No. 865,532, Apr. 9, 1992, abandoned.

[51] Int. Cl.$^6$ .................................................. F26B 9/00
[52] U.S. Cl. ............................. 34/164; 34/401; 15/304
[58] Field of Search .......................... 34/164, 219, 401, 34/426; 15/304, 310

[56] References Cited

U.S. PATENT DOCUMENTS 1,691,514  11/1928  Dollinger ................................. 15/304
4,067,749  1/1978  McKinney ................................. 15/304

Primary Examiner—Henry Bennet
Assistant Examiner—Dinnatia Doster
Attorney, Agent, or Firm—Salzman & Levy

[57] ABSTRACT

The present invention provides apparatus for low-cost extraction of oil residues from oil filters. The apparatus of the invention has a mounting structure or plate to which a number of oil filters can be strapped. Over 95% of the oil in each filter can be drained therefrom under the influence of gravitational forces. Oil draining from the oil filters is allowed to gather in a pan, bucket, container or well located below the mounting plate. Connected to the mounting structure is a mechanical or electrical oscillator for imparting a vibratory oscillation to the mounting structure and, hence, to the mounted oil filters. The weak surface tension and molecular forces between the residual oil molecules and the paper filter materials will be overcome by the vibration, and the residual oil will run off.

10 Claims, 3 Drawing Sheets

APPARATUS FOR EXTRACTING OIL FROM SPENT OIL FILTERS

RELATED APPLICATION

This application is a continuation-in-part of patent application, Ser. No. 07/865,532, filed Apr. 9, 1992, titled "Method and Apparatus for Extracting Oil From Spent Oil Filters" now abandoned.

FIELD OF THE INVENTION

The present invention relates to a method and apparatus for oil filters, and, more particularly, to a process and apparatus for extracting residual oil from used and discarded oil filters.

BACKGROUND OF THE INVENTION

The U.S. Environmental Protection Agency (EPA) has recently passed a regulation requiring the proper disposal of used automotive oil filters. The used oil entrapped in the paper filters of these devices is deemed toxic. Approximately 88% of the residual oil can be extracted through draining and crushing. However, the EPA classifies any oil filter having more than 5% residual oil as being a hazardous waste. If the oil filter is to be buried in a landfill without extracting another 7–8% of the residual oil, stringent procedures must be followed. To squeeze another 7–8% of the residual oil from the filter would necessitate crushing it with a fifty-ton press. Neither of these solutions is economically viable.

A more practical solution, which would be in compliance with the law, would be to recycle these materials. At present, however, scrap metal dealers are unwilling or unable to accept the scrap metal contained in the filter, even though the steel is of high quality. Posing more of a difficulty, however, is the recovery of the oil and oil residues still contained within the steel jacket. Notwithstanding these problems, the staggering number of discarded automobile oil filters makes it imperative that a recycling solution be quickly found.

The creator of this invention believes that scrap metal dealers will in time be persuaded to accept the scrap steel from the filters. Remaining, then, is the problem of extracting at least 95% of the oil at a reasonable cost, i.e., without the expense of employing large crushing presses.

The present invention comprises a low-cost process and apparatus wherein the residual oil can be removed from automotive oil filters.

Oil which is residually trapped in the paper filter materials will not drain from the filter under pressure or by gravitational forces, due to the surface tension and the forces of attraction between the oil and paper molecules.

The current invention reflects the discovery that the entrapped oil in each filter can easily be drained therefrom by mounting the draining filters on a vibratory apparatus. The apparatus has means to impart a mechanically- or electrically-induced vibration to the oil filters. Vibration between the range of 100 Hz to 8,000 Hz or more has been found to break the weak surface tension forces between the oil and paper filter materials. The oil will then be able to drain from the oil filter due to gravitational force. This method is an extremely low-cost solution to the above-mentioned problem; all it requires is a simple, vertically disposed oil filter mounting board and a mechanical or electrical oscillator mounted thereon.

To further enhance the draining of the residual oil, the aforementioned system and method also feature an apparatus for circulating hot air or steam about the oil filters while they are vibrated. The heat imparted to the steel jacket of the oil filters is quickly transferred to the residual oil, causing the oil to become less viscous, and hence, freely flowing. In this manner, the resident oil is more easily drained from the automobile oil filters.

DISCUSSION OF RELATED ART

Materials may be cleaned by using ultra-sound equipment. The vibrational range used to clean the materials, however, requires the immersion of the subject substance in a fluid bath. This type of cleaning is not as efficient as the recovery procedure of the present invention. With the former cleaning method, the oil would need a further step, that of extraction from the bath liquid. With that method, too, the vibrational extraction range is much higher and the energy costs greater. The use of gravity by the present invention greatly simplifies the extraction process.

In addition, the liquid of the ultrasonic bath does not always fully penetrate the filter jacket. Even when penetration is complete, the released oil molecules are not always fully free to migrate from the confines of the jacket, due to the mechanical configuration thereof. Thus, an unacceptable amount of residue may remain within the oil filter.

U.S. Pat. No. 5,135,176 issued to John Barber for "Method of Recycling of Oil Filters" discloses a method of recycling oil filters in which a shredder and thermal unit are provided. Oil filters are shredded into metal and porous media particles, which are then placed in the thermal unit and heated. The heating step of the aforementioned patent is performed for the purpose of converting porous media to ash. It is not performed while the oil filter is being vibrated, but after the vibration ceases.

Furthermore, Barber teaches a continuous process for use with a large recycling operation. No mention is made of the fact that a batch process may be more appropriate for individual garages and service stations.

Moreover, Barber does not mount oil filters in any specific orientation, but allows the filters to drop onto a conveyor belt in random positions. Thus, while some oil filters may be appropriately positioned, many or most of the oil filters are not oriented in optimum vertical position, for allowing gravity to help remove (drain) the oil. Neither does Barber disclose the use of gas under pressure to facilitate removal of oil from filters.

Nor does the reference disclose a mechanism for capturing recovered, spent oil. In fact, Barber describes the porous media turning to ash, which actually teaches away from a system in which oil is recovered from oil filters. Finally, since no data is presented in this reference to show that the system works to remove oil from the filters, the reader is left with the impression that the system may not be especially efficient.

SUMMARY OF THE INVENTION

In accordance with the present invention, there is provided a method and apparatus for low-cost extraction of oil residues from oil filters for recycling purposes. The apparatus of the invention comprises means defining a mounting structure or plate where a plurality of oil filters can be strapped thereto. Over 95% of the oil in each filter can be drained therefrom under the influence of gravitational forces. Oil draining from the oil filters is allowed to gather in a pan, bucket or well disposed below the mounting plate.

Operatively connected to the mounting structure is a mechanical or electrical oscillator for imparting a vibratory oscillation to the mounting structure and, hence, to the mounted oil filters. The weak surface tension and molecular forces between the residual oil molecules and the paper filter materials will be overcome by the vibration, and the residual oil will run off. It has been found that vibration between the range of 100 Hz to 8,000 Hz or more will most efficiently remove the residual oil from the oil filters. Applying gas, such as air, under force to the filter has been found to facilitate oil removal from creases in the paper filter. To further facilitate draining of the oil from the oil filters, the invention provides means for circulating hot air or steam about the oil filters as they are drained of oil. The heat from the hot air or steam is conducted through the steel jackets of the automotive oil filters to the resident oil. The viscosity of the oil is decreased as the oil becomes heated, thus enhancing the draining of the extraction process.

BRIEF DESCRIPTION OF THE DRAWINGS

A complete understanding of the present invention may be obtained by reference to the accompanying drawings, when taken in conjunction with the detailed description thereof and in which.

For the purposes of clarity and brevity, like elements and components will bear the same designation throughout the figures.

DESCRIPTION OF THE PREFERRED EMBODIMENT

This invention features an apparatus and method for extracting at least 95% of the resident oil from discarded oil filters, especially but not limited to automobile oil filters. The used oil filters are mounted on a vertically disposed plate or structure and are subjected to both vibratory and gravitational forces to dislodge the residual oil. This causes oil to drain from the oil filters. The removed oil it is collected in a drainage pan. Heat may be convected about the oil filters during the vibration cycle, to reduce the viscosity of the oil and, hence, enhance the drainage thereof. It should also be understood that the movement of the filters within the canister, during vibration, itself creates heat, which in turn lowers viscosity and facilitates oil removal.

Figure 1A:
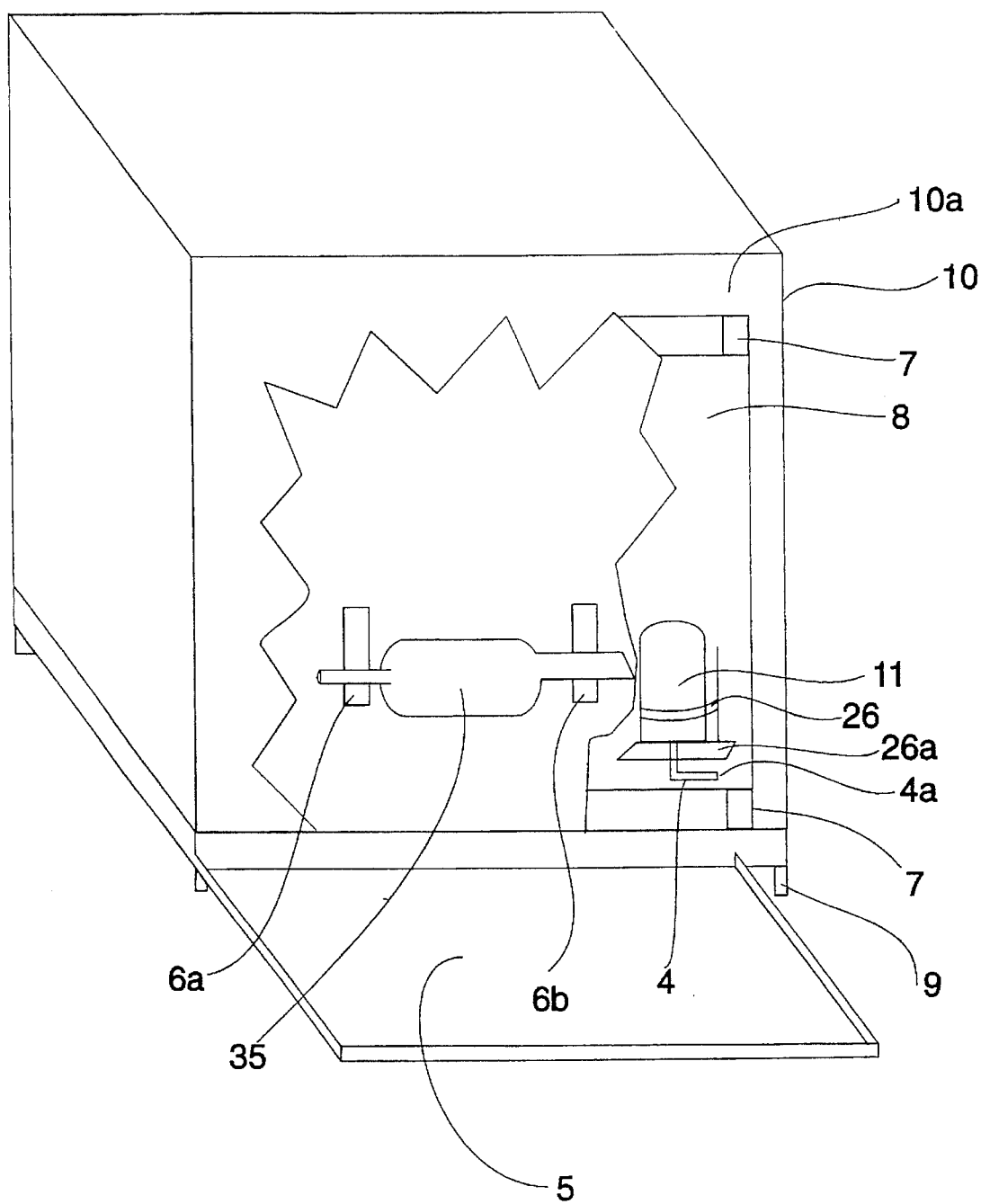
FIG. 1a is a perspective, cut-away view of the preferred embodiment of the extraction apparatus of this invention.

Now referring to FIG. 1a, apparatus 10 for recovering the resident oil in a used and discarded oil filter 11 is illustrated. The housing of the apparatus 10 is substantially rectilinear, having four legs 9. The foot of each of the legs 9 consists of vibration-isolating and shock-absorbing material, such as rubber or another elastomeric composition, as is well known in the art. Offset from one of the vertical walls 10a of housing 10, and mounted thereto by appropriate shock-isolation spacers 7, is a vertically disposed filter mounting plate 8.

The oil filter 11 can be securely mounted to mounting plate 8 by means of a restraining strap or other suitable clamping device 26. A platform 26a is also provided beneath restraining strap 26 to help support and hold the filter 11 in proper operative position.

An electrical or mechanical source of vibration 35 (such as an oscillating motor) is directly affixed to the mounting plate 8 in order to overcome the molecular and surface tension forces of the oil and filter paper molecules. In the preferred embodiment, a high-speed (5,000-30,000 r.p.m.) motor 35 is used to provide the required vibratory motion. Connected to the shaft of the motor 35, at each end thereof, is a counterweight, shown as reference numerals 6a and 6b, respectively.

A suitably dimensioned tube or pipe 4 can be inserted into the center orifice of the base of oil filter 11. Connected to tube or pipe 4 at its other end 4a is an air compressor (not shown) or other source of compressed (pressurized) gas, such as air.

In operation, vibratory motion is translated from the motor 35 through the mounting plate 8 and to the oil filter 11. The vibration loosens the residues of oil contained within the oil filter 11, allowing a large portion thereof to drain from the filter 11. The air forced into the oil filter, during vibration thereof, aids in removing oil disposed in creases in the paper filter materials. Situated below the oil filter is a removable container or pan 5 for receiving the drained, used oil as it flows from the filter 11. It should be understood that other mechanisms for capturing the oil can be used without departing from the scope of the present invention. For example, the apparatus 10 can be disposed above a 55-gallon drum or other container or it can be disposed above a drainage hose, if desired.

Although only one filter 11 is shown in FIG. 1a, it should be understood that oil may be extracted from a plurality of filters, if desired, as long as they are suitably mounted on the mounting plate 8.

It has been found that the temperature of the oil filter 11 and the oil therein increases while it is vibrating. During the course of a 8-minute vibration cycle, the temperature of the oil can rise as much as 30°. The temperature elevation decreases viscosity of the oil and results in better drainage thereof.

Figure 1B:
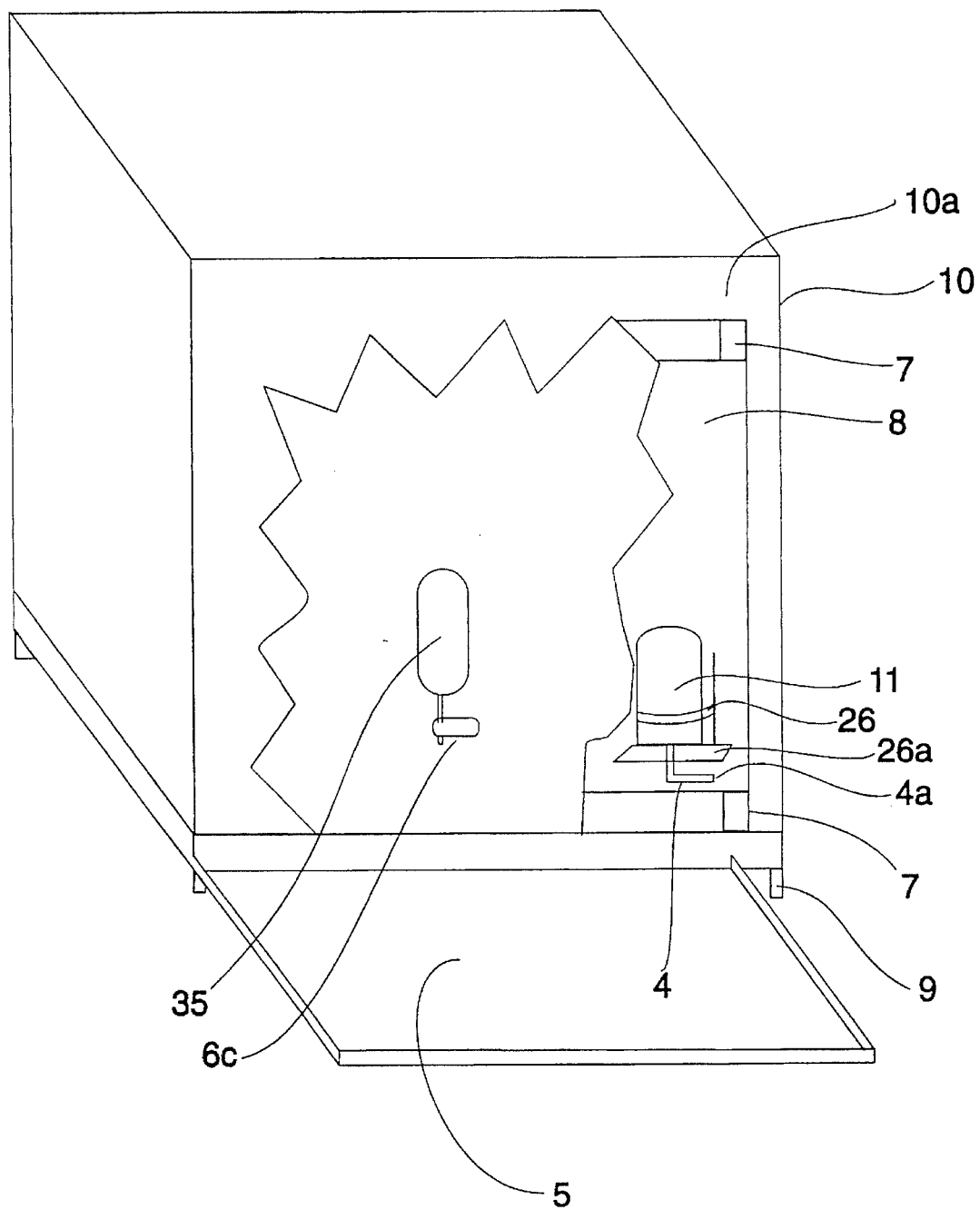
FIG. 1b is a perspective, cut-away view of an alternate embodiment of the extraction apparatus of this invention, wherein the motor is not directly affixed to the mounting plate.

Referring now also to FIG. 1b, there is shown the apparatus of FIG. 1a, but with a different motor mounting position. In FIG. 1b, the motor 35 is disposed at a right angle to the mounting plate 8. Rather than affixing the motor 35 to the mounting plate 8, the motor 35 is secured to the frame of housing 10, as is well known in the art. A cam 6c is attached to the shaft of the motor 35 and fits into a bearing, not shown, which, in turn, is affixed to the interior surface of the mounting plate 8. The effect of this configuration is identical to that of the FIG. 1a device: the mounting plate 8 is caused to vibrate.

Figure 2:
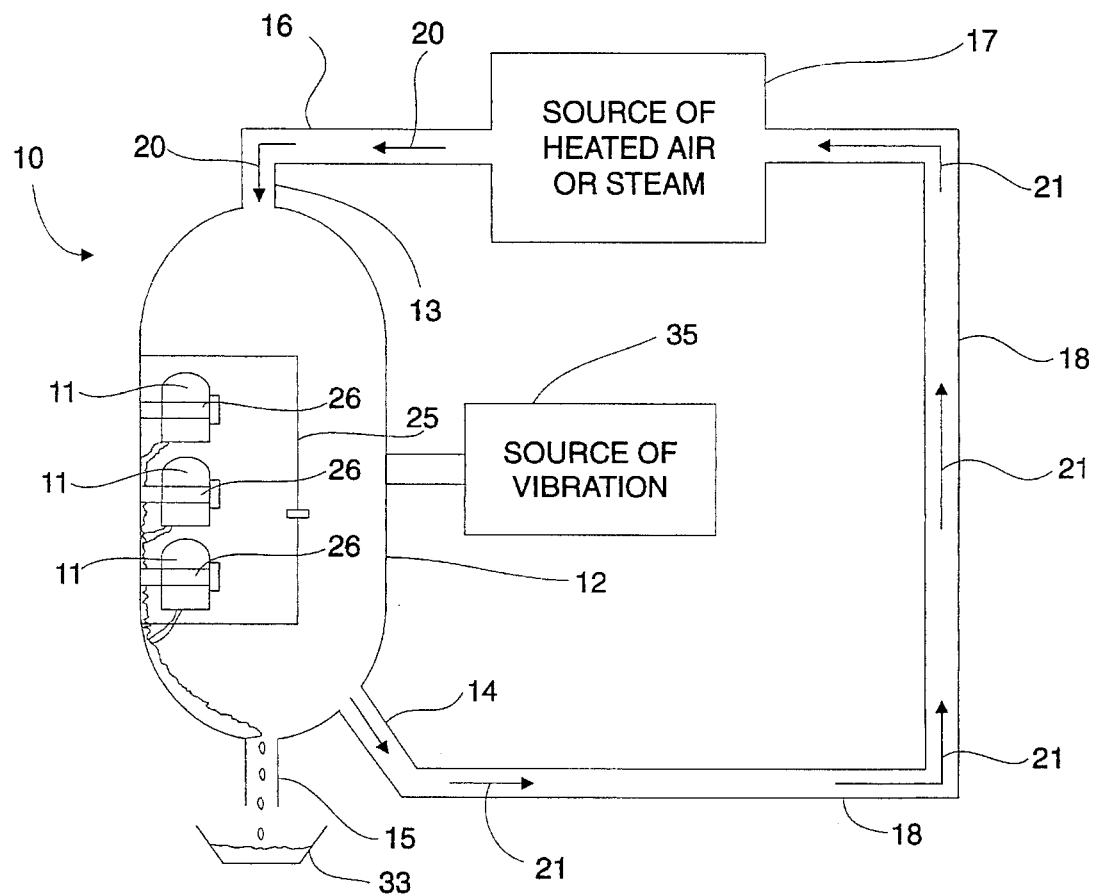
FIG. 2 is a partial, perspective view of the oil extraction apparatus of the recycling system of an alternate embodiment of this invention.

Referring now also to FIG. 2, there is shown an alternate embodiment of the oil extraction apparatus of the present invention, using the aforementioned heated oil principle. A small recovery chamber 12 is provided, fabricated of a transparent plastic, such as Lexan. The recovery chamber 12 has an inlet 13 at the top and two outlets, 14 and 15, at the bottom. Hot air or steam is introduced into the recovery chamber 12 through the inlet 13, which receives the heated fluid (arrows 20) through a supply conduit 16 connected to a source of heated air or steam 17. The heated air or steam enters the small chamber 12 and bathes several automotive oil filters 11 which are mounted on an inner wall 24 (FIG. 3) of an access door 25.

The spent air or steam, having given up part of its heat to the automotive oil filters 11, is evacuated by vacuum through outlet 14 to the return conduit 18. The spent air or steam returns (arrows 21) to the source of heated air or steam 17 through conduit 18 and is recirculated back into small chamber 12, as illustrated.

Of course, in conjunction with the heated air configuration herein described, pressurized air can also be applied to each oil filter, as hereinabove described, to aid in oil residue removal from the paper filters.

Figure 3:
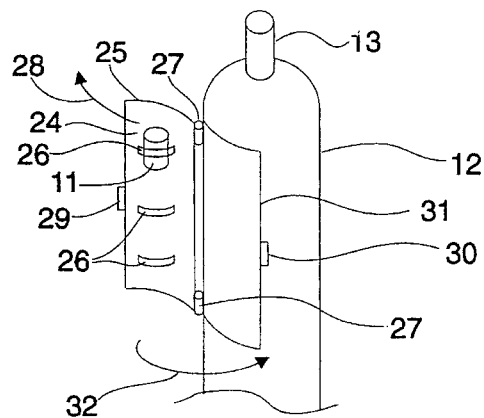
FIG. 3 is a perspective view of the oil extraction apparatus shown in FIG. 2, illustrating the mounting of automobile oil filters to the door of the extraction apparatus.

The oil filters 11 are individually mounted to the inner wall 24 of the door 25 of chamber 12, by means of clamps 26 (as illustrated more clearly in FIG. 3).

The mounting door 25 is articulately affixed to chamber 12 by means of hinges 27. When discarded, oil-filled filters 11 are placed into chamber 12, the door 25 is swung open (arrow 28) by releasing the catch 29 mounted to the door 25. The catch 29 releases the door 25 from its sealed position by means of a corresponding catch 30 disposed on the edge of chamber opening 31.

After the oil filters 11 are affixed on the inner vertical wall 24 of door 25, the door 25 is swung closed (arrow 32) to seal the chamber 12. The mounted oil filters are disposed upon door 25, which is vertically positioned about chamber 12; this allows the residual oil disposed therein to drain down the inner wall of chamber 12 to outlet 15. A bucket or well 33 disposed below outlet 15 catches the draining oil for recovery purposes.

In accordance with the invention, and as hereinabove described with respect to the apparatus of the preferred embodiment, an electrical or mechanical source of vibration 35 (such as an oscillator) is mounted to chamber 12, in order to overcome the molecular and surface tension forces of the oil and filter paper molecules. The vibration loosens the residues of oil contained within the oil filters 11, allowing a large portion thereof to drain from the filters 11. The introduction of gas under pressure to the oil filter 11 has been found to effectively remove oil from the creases and folds in the paper filter. Through the circulation of hot air or steam, heat is imparted to the metal jacket of the oil filters 11, which, in turn, causes the oil to become heated and lose its viscosity. This consequently aids in the flow and draining of the residual oil.

Experiments conducted with the illustrated apparatus have shown that vibration in the frequency range between 100 Hz and 8,000 Hz or more appears to be most effective in loosening the oil from the internal paper filters (not shown) disposed in the automobile oil filters 11. The amount of oil remaining in the automobile oil filters is now generally less than five percent (5%) by weight.

Tests were conducted in accordance with the invention as set forth in the following examples:

EXAMPLE 1

In one test, a Fram® oil filter, model no. PH-13, was removed from a vehicle and allowed to drain by gravity for approximately 10 minutes. This drainage operation could also have been performed by mounting the filter 11 to the apparatus 10. The filter 11 was then mounted to the apparatus 10 shown in FIG. 1a. Motor 35 was caused to vibrate at approximately 8,000 r.p.m. for a period of approximately 8 minutes. The weight of a filter without oil is 13 oz. (368.29 grams). The weight of the used filter (with oil residue after drainage) was 509.94 g. Therefore, the amount of oil in the filter was 141.65 g. After the aforementioned 8-minute vibration cycle, the removed oil weighed 138.49 g. Thus, the oil that remained in the filter after vibration was 3.16 g, or less than 1% (approx. 0.98%) of the total amount of initial oil.

EXAMPLE 2

In another test, a Fram® oil filter, model no. PH-13, was removed from a vehicle and allowed to drain by gravity for approximately 10 minutes. The filter 11 was then mounted to the apparatus 10 shown in FIG. 1a. Motor 35 was caused to vibrate at approximately 100 r.p.m. for a period of approximately 1.5 hours. The weight of a filter without oil is 13 oz. (368.29 grams). The weight of the used filter (with oil residue after drainage) was 520.12 g. Therefore, the amount of oil in the filter was 151.83 g. After the aforementioned 1.5-hour vibration cycle, the removed oil weighed 144.27 g. Thus, the oil that remained in the filter after vibration was 7.56 g, or approximately 4.98% of the total amount of initial oil.

This reduction to less than five percent of remaining oil residues now allows the "toxic waste" classification to be lifted, according to current EPA guidelines. Thus, the oil filters 11 can be safely disposed of in a landfill, if so desired.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having described the current invention, what is desired to be protected by Letters Patent is presented by the subsequently appended claims.

What is claimed is:

1. An apparatus for extracting oil from oil filters so that only a maximum of approximately five percent of the residual oil remains therein, comprising:

a chamber for extracting residual oil from used and discarded oil filters;

means defining a vertically disposed surface within said chamber wherein said used and discarded oil filters can be mounted;

means for mounting at least one oil filter onto said vertically disposed surface, so that residual oil disposed within said oil filter can be drained therefrom under the influence of gravitational forces;

vibratory means operatively connected to said chamber, for subjecting said at least one oil filter to vibration, whereby said residual oil will be caused to drain from said oil filter, and the amount of remaining residual oil therein will become less than five percent by weight; and means disposed below said chamber for collecting draining residual oil as it drains therefrom.

2. The apparatus in accordance with claim 1, further comprising means for introducing gas under pressure into said at least one oil filter to aid in removing said residual oil therefrom.

3. The apparatus in accordance with claim 1, further comprising means for circulating heated fluid through said chamber to reduce the viscosity of entrapped oil in said oil filter, to enhance the draining of residual oil from said oil filter.

4. The apparatus in accordance with claim 1, wherein said vertically disposed surface comprises a wall of said chamber.

5. The apparatus in accordance with claim 4, wherein said means for mounting said at least one oil filters comprises at least one retaining strap, disposed upon said chamber wall, which is expandable to accommodate an oil filter.

6. The apparatus in accordance with claim 1, wherein said vibratory means comprises a motor.

7. The apparatus in accordance with claim 2, further comprising means for circulating heated fluid through said chamber to reduce the viscosity of entrapped oil in said oil filter, to enhance the draining of residual oil from said oil filter.

8. The apparatus in accordance with claim 7 wherein said vertically disposed surface comprises a wall of said chamber.

9. The apparatus in accordance with claim 8, wherein said means for mounting said at least one oil filters comprises at least one retaining strap, disposed upon said chamber wall, which is expandable to accommodate an oil filter.

10. The apparatus in accordance with claim 9, wherein said vibratory means comprises a motor.

* * * * *